US 12,083,904 B2

United States Patent
Ragot et al.

(10) Patent No.: US 12,083,904 B2
(45) Date of Patent: Sep. 10, 2024

(54) FASTENING ARRANGEMENT FOR ATTACHING A BATTERY PACK TO A VEHICLE FRAME

(71) Applicant: Volvo Truck Corporation, Gothenburg (SE)

(72) Inventors: Sébastien Ragot, Gothenburg (SE); Jonatan Hörder, Mölndal (SE); Sondre Landvik, Gothenburg (SE); Mikael Boisen, Gothenburg (SE); Gustav Andersson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 230 days.

(21) Appl. No.: 17/601,509

(22) PCT Filed: Apr. 11, 2019

(86) PCT No.: PCT/EP2019/059327
§ 371 (c)(1),
(2) Date: Oct. 5, 2021

(87) PCT Pub. No.: WO2020/207592
PCT Pub. Date: Oct. 15, 2020

(65) Prior Publication Data
US 2022/0161669 A1 May 26, 2022

(51) Int. Cl.
*B60L 50/60* (2019.01)
*B60K 1/04* (2019.01)
(Continued)

(52) U.S. Cl.
CPC ............. *B60L 50/66* (2019.02); *B60K 1/04* (2013.01); *B60L 50/64* (2019.02);
(Continued)

(58) Field of Classification Search
CPC ...... B60L 50/66; B60L 50/64; H01M 50/249; H01M 50/264; H01M 50/244; H01M 50/204; B60K 1/04
See application file for complete search history.

(56) References Cited

U.S. PATENT DOCUMENTS

| 6,053,533 A | 4/2000 | Osborn et al. |
| 6,378,823 B1 | 4/2002 | Edholm |
(Continued)

FOREIGN PATENT DOCUMENTS

| CN | 101296812 A | 10/2008 |
| CN | 101331032 A | 12/2008 |
(Continued)

OTHER PUBLICATIONS

First Office Action for Chinese Patent Application No. 201980095233. 5, mailed Mar. 23, 2023, 40 pages.
(Continued)

*Primary Examiner* — James A Shriver, II
*Assistant Examiner* — Nicholas R. Kandas
(74) *Attorney, Agent, or Firm* — Withrow & Terranova, PLLC (57) ABSTRACT

A fastening arrangement for attaching a battery pack to a vehicle frame of a vehicle. The fastening arrangement comprises one or more main brackets arranged attachable to the vehicle frame, each main bracket comprising a receiving member arranged to hangably support a corresponding mounting element. The fastening arrangement also comprises one or more of the mounting elements configured attachable to the battery pack. The fastening arrangement further comprises one or more mounting straps arranged to press the battery pack against the one or more main brackets.

8 Claims, 4 Drawing Sheets

(51) Int. Cl.
*B60L 50/64* (2019.01)
*H01M 50/204* (2021.01)
*H01M 50/244* (2021.01)
*H01M 50/249* (2021.01)
*H01M 50/264* (2021.01)

(52) U.S. Cl.
CPC ....... *H01M 50/204* (2021.01); *H01M 50/244* (2021.01); *H01M 50/249* (2021.01); *H01M 50/264* (2021.01)

(56) References Cited

U.S. PATENT DOCUMENTS

| | | | |
|---|---|---|---|
| 2012/0025045 A1* | 2/2012 | Meier | H01M 50/202 248/229.1 |
| 2012/0224326 A1* | 9/2012 | Kohlberger | H01M 10/656 361/689 |
| 2017/0072791 A1 | 3/2017 | Sloan et al. | |
| 2017/0267121 A1* | 9/2017 | Kotik | H01M 50/242 |
| 2018/0123098 A1 | 5/2018 | Maguire et al. | |
| 2018/0297658 A1 | 10/2018 | Mercat | |
| 2019/0084415 A1 | 3/2019 | Sloan et al. | |

FOREIGN PATENT DOCUMENTS

| | | |
|---|---|---|
| CN | 202142593 U | 2/2012 |
| CN | 102576831 A | 7/2012 |
| CN | 202294220 U | 7/2012 |
| CN | 205452393 U | 8/2016 |
| CN | 106794751 A | 5/2017 |
| CN | 107089135 A | 8/2017 |
| CN | 108290496 A | 7/2018 |
| CN | 108346769 A | 7/2018 |
| CN | 208343924 U | 1/2019 |
| CN | 208515563 U | 2/2019 |
| DE | 102016005068 A1 | 11/2016 |
| DE | 102017009176 A1 | 4/2018 |

OTHER PUBLICATIONS

International Search Report and Written Opinion for International Patent Application No. PCT/EP2019/059327, mailed Dec. 17, 2019, 11 pages.

International Preliminary Report on Patentability for International Patent Application No. PCT/EP2019/059327, mailed Jun. 28, 2021, 14 pages.

Notification to Grant for Chinese Patent Application No. 201980095233.5, mailed Feb. 28, 2024, 6 pages.

* cited by examiner

FASTENING ARRANGEMENT FOR ATTACHING A BATTERY PACK TO A VEHICLE FRAME

This application is a 35 USC 371 national phase filing of International Application No. PCT/EP2019/059327, filed Apr. 11, 2019, the disclosure of which is incorporated herein by reference in its entirety.

TECHNICAL FIELD

The present disclosure relates to electrical power sources for powering vehicles, and to manufacturing of electrically powered vehicles.

The invention can be applied in cargo transport vehicles, such as for providing drive power in towing truck and semi-trailer combinations. Although the invention will be described mainly with respect to a semi-trailer vehicle, the invention is not restricted to this particular vehicle, but may also be used in other vehicles, such as trucks, buses, recreational vehicles and construction equipment.

BACKGROUND

Electrically powered cargo transport vehicles require an electrical energy source, i.e., a battery system, which is capable of delivering the required power and which has sufficient energy capacity. Different types of cargo transport vehicles have different requirements on power and energy capacity of the battery system. Some vehicles targeted at long-haul transport of heavy goods may require a larger battery system compared to smaller vehicles which are used on shorter routes. Some vehicles also require a higher power outtake from the battery system compared to other vehicles.

Vehicles for cargo transport often differ in terms of, e.g., wheel base dimension, axle configuration, and load capacity. The available space for efficiently mounting battery systems is therefore different between different vehicle types.

To cope with these different requirements, one or several extra battery packs can be mounted on vehicles to increase the energy capacity as needed. However, this causes a significant increase in complexity when it comes to the additional routing of battery interfaces such as electrical power, control signals, electrical ground, and cooling.

US20120224326 A1 discloses a modular battery structure where the number of modules can be selected based on energy requirements.

The batteries in electrical vehicles, and especially in cargo transport vehicles, are often very large and heavy. Therefore, a secure and efficient way of mounting these battery systems to the vehicle frame is needed. The mounting solution should be production friendly on an assembly line where the time spent on each station is limited. The mounting solution should also be safe in the sense that the risk of injury to technicians should be minimized.

CN 208515563 U discloses a battery mounting arrangement comprising a bracket having a hook portion onto which a protruding mechanical mounting element of a battery pack is mountable.

There is a need for battery systems which can be adapted to different types of electric vehicles and which are easily assembled on the vehicle during manufacturing.

SUMMARY

It is an object of the present disclosure to provide improved fastening arrangements, battery packs, and methods for mounting battery packs to vehicles.

This object is at least in part obtained by a fastening arrangement for attaching a battery pack to a vehicle frame of a vehicle. The fastening arrangement comprises one or more main brackets arranged attachable to the vehicle frame. Each main bracket comprises a receiving member arranged to hangably support a corresponding mounting element. The fastening arrangement comprises one or more of the mounting elements configured attachable to the battery pack and also one or more mounting straps arranged to press the battery pack against the one or more main brackets.

The combination of the hangably supported mounting elements and the mounting straps provide for an efficient and safe assembly, and also a robust fastening of the battery pack to the vehicle frame.

According to aspects, the battery pack comprises a plurality of modules arranged adjacent to each other. Each module comprises first and second opposite side walls arranged to face respective side walls of adjacent modules. The fastening arrangement comprises at least one intermediary bracket arranged in-between the side walls of two adjacent modules to increase a structural integrity of the battery pack, wherein the intermediary bracket comprises one of the mounting elements arranged to be hangably supported by a receiving member of a main bracket.

The intermediary bracket provides increased structural integrity of the overall battery assembly at the same time as it provides a more robust anchor for the mounting element.

According to aspects, a pretension or stiffness of a first mounting strap is different from a pretension or stiffness of a second mounting strap, thereby allowing for control of load distribution between the first and second mounting straps.

Thus, advantageously, load distribution over the fastening arrangement parts can be controlled and optimized by selecting pretension or stiffness of the first mounting strap in relation to corresponding pretension or stiffness of the second mounting strap. For example, the first mounting strap is arranged closer to a mid-point of the battery pack and has a larger stiffness compared to the second mounting strap which is arranged farther away from the mid-point compared to the first mounting strap, thereby providing a more even load distribution between the first and the second mounting straps.

The pretension of stiffness values can be selected based on vehicle type and battery pack dimensions, which allows for further optimization of the fastening arrangement mechanical properties.

According to aspects, the vehicle frame comprises one or more frame rails, and the one or more main brackets are arranged to be mounted on a frame rail.

The frame rail, e.g., between wheel axles of the vehicle, offers a suitable area or mounting a battery pack. The disclosed fastening arrangement is particularly suitable for mounting battery packs to the sides of frame rails.

According to aspects, the one or more main brackets comprise resilient elements, such as rubber elements or other vibration damping members, configured between the main brackets and the battery pack when the battery pack is pressed against the one or more main brackets.

The resilient members provide vibration damping properties of the fastening arrangement, which is an advantage. The resilient elements also protect the battery pack during assembly, e.g., if the battery pack swing down to impact the main brackets as it is hangably supported on the main brackets.

There are also disclosed herein vehicles and battery packs associated with the above-mentioned advantages.

The above object is also at least in part obtained by a method for securing a battery pack to a vehicle. The method comprises attaching one or more main brackets to a frame of the vehicle. Each main bracket comprises a receiving member arranged to hangably support a corresponding mounting element. The method also comprises obtaining a battery pack comprising one or more of the mounting elements, wherein each mounting element is arranged to be hangably supported by a corresponding receiving member of a main bracket and hanging the battery pack by the mounting elements on the main bracket receiving members. The method furthermore comprises providing one or more mounting straps and pressing the battery pack against the main brackets by the mounting straps, thereby securing the battery pack to the vehicle frame.

According to some aspects, the method also comprises providing a first mounting strap having a pretension or stiffness different from a pretension or stiffness of a second mounting strap, thereby allowing for control of load distribution between the first and the second mounting straps.

According to some further aspects, the method comprises configuring a first mounting strap arranged closer to a mid-point of the battery pack with a larger stiffness compared to a second mounting strap arranged farther away from the mid-point.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

As noted above, the batteries in electrical vehicles, and especially in cargo transport vehicles, are often very large and heavy. Therefore, a secure and efficient way of mounting these battery systems to the vehicle frame is needed. The mounting solution should be production friendly on an assembly line where the time spent on each station is limited.

The present disclosure comprises a fastening arrangement which simplifies assembly of a heavy battery pack onto a vehicle. The fastening arrangement comprises three main components; brackets, mounting elements arranged to be hangably supported by the brackets, and mounting straps.

The battery pack has one or more mounting elements attached to it which are adapted to be hung from corresponding brackets mounted on the vehicle frame. This way, a technician can lift the heavy battery in place and support it hangably from the brackets on the vehicle frame. Once hangably supported, the technician can proceed without risk to further secure the battery pack to the vehicle by means of mounting straps that press the battery pack against the brackets. The mounting straps can be assembled immediately following the liftin of the battery pack onto the brackets, or they can be assembled at a later point in time. For instance, a temporary mounting strap can be used to temporarily secure the battery in the hanging position, and more permanent mounting straps can be assembled at a later station along the manufacturing line, perhaps after connections between the vehicle and the battery pack has been installed.

Different types of cargo transport vehicles have different requirements on power output and energy capacity of the battery system. Vehicles for cargo transport also differ in terms of, e.g., wheel base dimension, axle configuration, and load capacity. The available space for efficiently mounting battery systems is therefore different between different vehicle types.

The present disclosure also comprises a modular battery pack which can be adapted to different energy capacity needs and vehicle frame geometries. The proposed modular battery system is scalable in that it comprises modules which can be assembled as needed into a suitable battery pack assembly having physical dimensions configured to fit a given vehicle frame, while providing required electrical power and energy capacity. This way batteries specifically adapted to a particular vehicle can be delivered to a manufacturing station and assembled with the vehicle in an efficient manner. The battery pack can also be configured to comprise a single control unit with interfaces for connecting to the vehicle. Thus, even if the size of the battery changes between vehicles, the interfacing towards the vehicle remains the same, which enables a more efficient assembly procedure.

Figure 1:
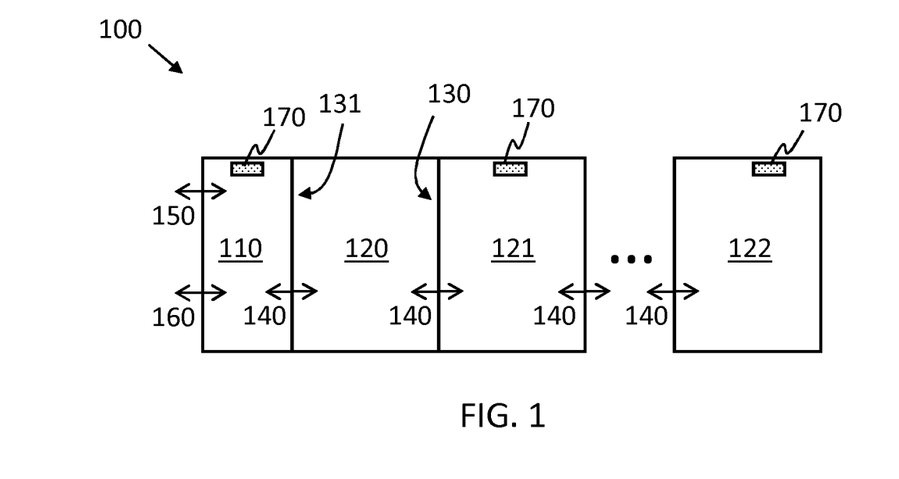
FIGS. 1-2 schematically illustrate battery packs.

FIG. 1 schematically illustrates an example battery pack according to the present teachings. The battery pack 100 can be mounted onto a vehicle frame of a vehicle. In general, a vehicle frame, also known as its chassis, is the main supporting structure of a motor vehicle, to which all other components are attached. One example of a vehicle 800 built around a vehicle frame 310 will be discussed below in connection to FIG. 8. The vehicle frame 310 may comprise rails extending between, e.g., wheel axles, to which battery packs can be mounted.

The battery pack 100 comprises a plurality of modules 120, 121, 122 arranged adjacent to each other. The battery pack 100 is constructed in a sandwich fashion, where each module is arranged adjacent to at least one other module. The modules in the middle of the battery pack, like module 121, has two adjacent modules, while the modules 120, 122 at the ends of the sandwich structure naturally only has one adjacent module.

To provide electrical power to the vehicle 800, at least one module constitutes an electrical energy storage module. Since the number of modules determine the electrical energy storage capacity, a required capacity can be obtained by selecting a suitable number of modules, assuming the modules all have the same voltage and are connected in parallel. To obtain a higher voltage, some modules may be connected in series. Optionally, the common set of interfaces 140 can be configurable between serial electrical connection and parallel electrical connection between modules. Thus, the overall battery pack voltage can be configured simply via the common set of interfaces.

Each module comprises first and second mutually opposite side walls 130, 131 arranged to face respective side walls of adjacent modules, and to provide structural integrity of the battery pack. The modules 121 located in the middle of the sandwich structure have side walls facing two other modules, while the end modules 120, 122 have one side wall facing another module. The side walls 130, 131 are made of a structurally supporting material, such as hard plastic or metal. This structurally supporting material makes the sandwich structure robust and allows it to tolerate mechanical stress.

Each side wall 130, 131 comprises a common set of interfaces 140 for interfacing between adjacent modules 120, 121, 122. This common set of interfaces will be discussed in more detail below. However, it is noted that the common set of interfaces are passing through the side walls and are therefore located in the battery pack interior. This means that the common set of interfaces is protected from outside interference by external objects. Also, the common set of interfaces will not interfere with, e.g., fastening means that are used to mount the battery pack to the vehicle. For instance, mounting straps can be used without risking damage to the common set of interfaces.

According to aspects, the common set of interfaces 140 comprises connections for electrical power, electrical ground, and cooling medium for cooling one or more electrical energy storage modules. This way the control unit 110 is connected to each battery module via the common set of interfaces.

The battery pack 100 also comprises at least one control unit 110 having a side wall comprising the common set of interfaces 140. The control unit 110 also comprises a vehicle interface 150, 160 for interfacing with the vehicle.

This way there is a single point of contact with respect to the vehicle, at least if only one control unit is used in the battery pack sandwich structure. Regardless of how many modules that are comprised in the battery pack 100, the electrical power connections, ground connection, and potentially also cooling medium connections are interfaced with through the control unit. This simplifies vehicle design, e.g., since different vehicles with different battery capacity requirements can have the same routing solutions for electrical power.

It is noted that the battery pack may comprise more than one control unit 110.

According to aspects, the control unit 110 comprises any of; a battery management unit (BMU), one or more fuses, a vehicle electrical interface 150, and a vehicle cooling medium interface 160.

Figure 2:
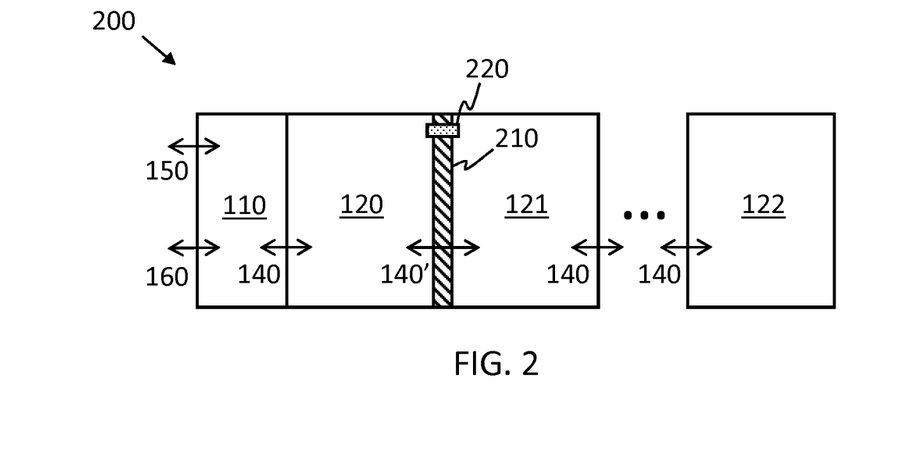

FIG. 2 schematically illustrates a battery pack 200 comprising at least one intermediary bracket 210 arranged in-between side walls 130, 131 of two adjacent modules 120, 121 to provide an increased structural integrity of the battery pack 200. This intermediary bracket provides further reinforcement to the structural support already provided by the side walls. For instance, in case the side walls are made in hard plastic, the intermediary brackets may be made of steel or aluminum. An intermediary bracket 210 provided between two modules or between a module and the control unit 110 functions as an interface between the modules and also as structural support.

Optionally, the intermediary bracket 210 comprises a mounting element 220 for mounting the battery pack 200 to a vehicle frame such that the side walls 130, 131 are oriented perpendicular to a driving direction D of the vehicle. Thus, the intermediary bracket offers a robust mounting option suitable for attaching the battery pack to, e.g., the rails of a vehicle frame 310.

FIGS. 3a, 3b, 4a, 4b, and 5 illustrate a fastening arrangement 300 according to the present teaching. One or more main brackets 320 are attached 321 to a vehicle frame 310. Each main bracket comprises a receiving member 340 arranged to hangably support a corresponding mounting element 170, 220 on the battery pack. The receiving member may be formed, e.g., as a hook or u-shaped protrusion, configured to receive and to hold a corresponding protrusion on the mounting element. The receiving member 340 thus counteracts a gravitational force acting on the mounting element to hold it in place.

Once the battery pack has been lifted in place by a crane 360 or similar lifting arrangement, i.e., once it is hangably supported by the main brackets, the crane 360 can be disengaged. To complete the assembly, mounting straps 350 are used to press the battery pack against the main brackets 320 in order to secure the assembly.

Optionally, the main brackets comprise resilient elements 330, such as rubber mats, configured in-between battery pack 100 and the main brackets 320.

Figure 10:
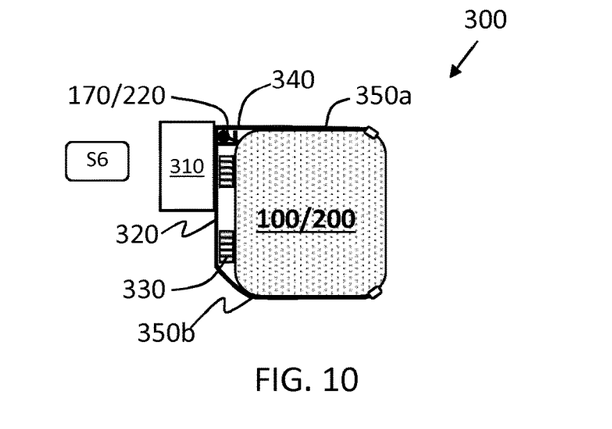
FIG. 10 illustrate an example battery pack mounted on a vehicle frame.

FIG. 10 illustrates an example fastening arrangements where a top mounting strap 350a and a bottom mounting strap 350b is used to press the battery pack against the main brackets 320 in order to secure the assembly, instead of a single strap covering the entire battery pack. It is appreciated that the one or more mounting straps 350a, 350b can be arranged in a number of different ways while still performing the intended function of pressing the battery pack against the main brackets 320 in order to secure the assembly.

FIGS. 3a, 3b, 4a, 4b, and 5 illustrate an example sequence of events during mounting of a battery pack 100 to a vehicle frame 310 using the fastening arrangement 300.

Figure 3A:
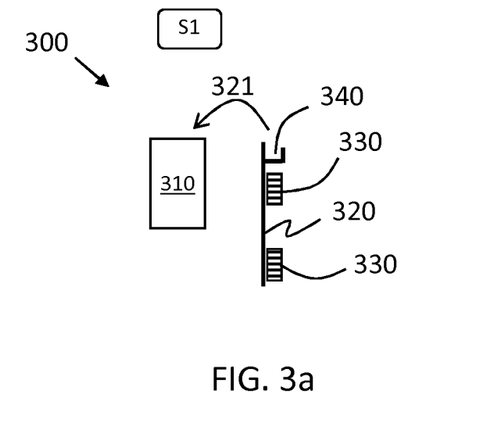
FIGS. 3-5 shows an example battery pack fastening arrangement.

In FIG. 3a, a main bracket 320 is attached 321 to the vehicle frame 310. This attachment may, e.g., comprise bolting the main bracket to the vehicle frame, riveting the main bracket to the vehicle frame, or welding the main bracket to the vehicle frame.

Figure 3B:
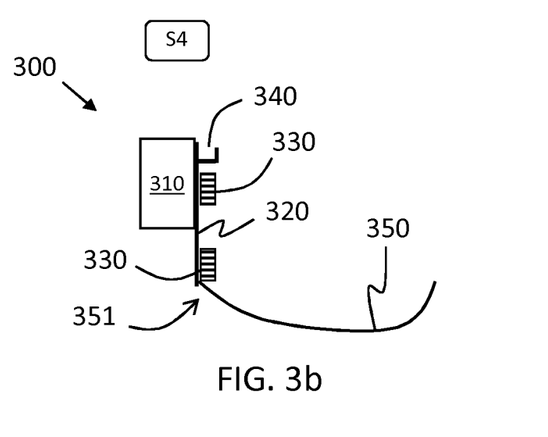

In FIG. 3b, a mounting strap 350 has been attached 351 to the main bracket 320. The mounting strap 350 may optionally be a temporary strap used to temporarily secure the battery pack to the vehicle frame during manufacturing.

The mounting strap 350 may also be a more permanent mounting strap which is part of the final fastening arrangement 300.

The mounting strap may be a nylon or fabric mounting strap, or it may be a metal mounting strap, such as a mounting strap commonly used for securing fuel tanks to vehicle frames 310. Mounting straps are known in general and will not be discussed in more detail herein.

Figure 4A:
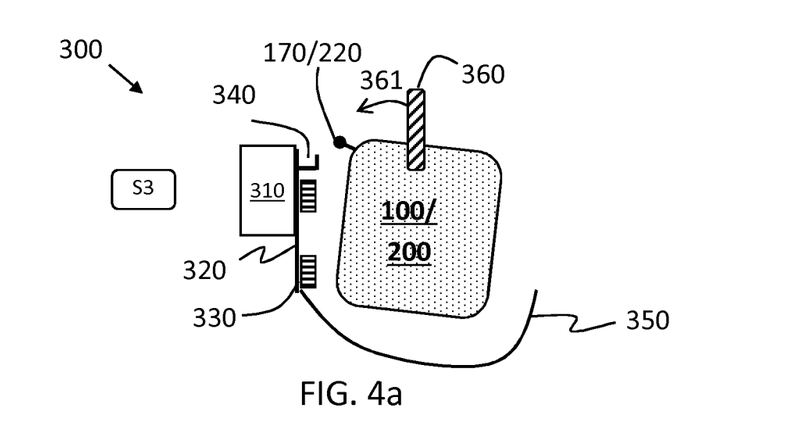

FIG. 4a shows a lifting device 360, such as a crane or the like, being used to lift 361 a battery pack comprising mounting elements 170, 220 into place, such that it is hangably supported from the receiving members 340 of the main brackets 320. Once hangably supported, the lifting device 360 may be disengaged safely. A mounting technician may then proceed with assembly operations without having to worry about the battery pack 100. Thus, an efficient and safe assembly process is enabled.

Figure 4B:
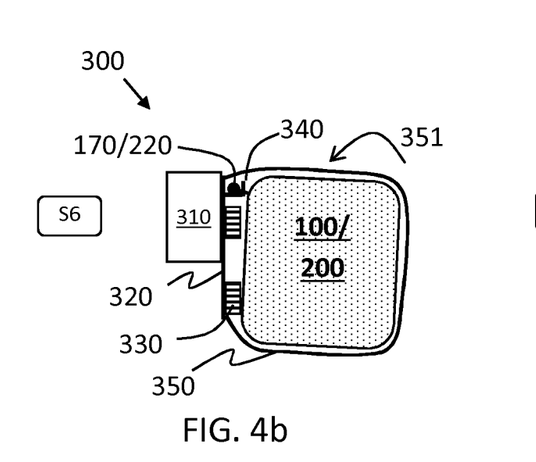

FIG. 4b illustrates the mounting strap 350 being arranged 351 in preparation for pressing the battery pack 100, 200 against the main bracket 320.

Figure 5:
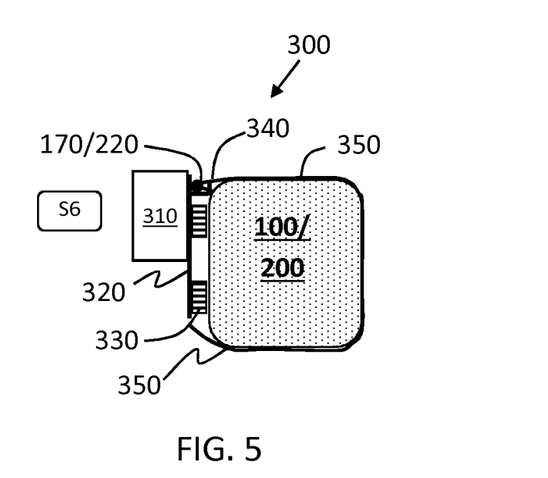

FIG. 5 illustrates the end result after pressing the battery pack 100, 200 against the main bracket 320.

To summarize, there is disclosed herein a fastening arrangement 300 for attaching a battery pack 100, 200 to a vehicle frame 310 of a vehicle 800. The fastening arrangement comprises one or more main brackets 320 arranged attachable 321 to the vehicle frame 310. Each main bracket 320 comprises a receiving member 340 arranged to hangably support a corresponding mounting element 170, 220 of a battery pack 100, 200. The fastening arrangement 300 also comprises one or more of the mounting elements 170, 220 configured attachable to the battery pack 100, 200. The fastening arrangement further comprises one or more mounting straps 350, 350a, 350b arranged to press the battery pack against the one or more main brackets 320.

Notably, the intermediary bracket 210 discussed above can optionally be used to reinforce the assembly. In this case, the mounting element 220 of the intermediary bracket 210 is also used to hangably support the battery pack 200 from corresponding main bracket receiving members 340.

Figure 6:
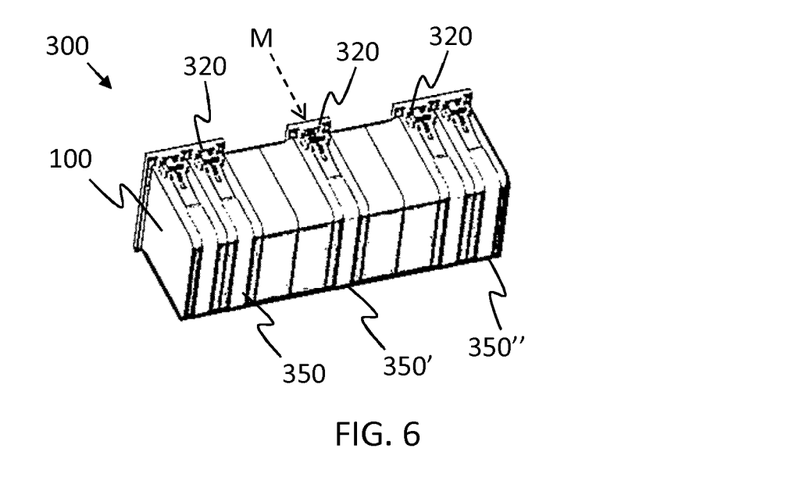
FIGS. 6-7 illustrate examples of battery packs mounted on vehicle frames.

FIG. 6 illustrates an example battery pack 100 attached to a set of main brackets 320 by the disclosed fastening arrangement 300.

Herein, stiffness is the extent to which an object resists deformation in response to an applied force. The complementary concept is flexibility or pliability: the more flexible an object is, the less stiff it is.

With reference to FIG. 6, optionally, a pretension or stiffness of a first mounting strap 350' is different from a pretension or stiffness of a second mounting strap 350". This allows for control of load distribution between the first and second mounting straps 350', 350".

One example of this type of load distribution comprises arranging the first mounting strap 350' closer to a mid-point M of the battery pack 100 with a larger stiffness compared to the second mounting strap 350" which is arranged farther away from the mid-point M compared to the first mounting strap 350'. This way a more even load distribution can be achieved between the first 350' and the second 350" mounting straps.

Figure 7:
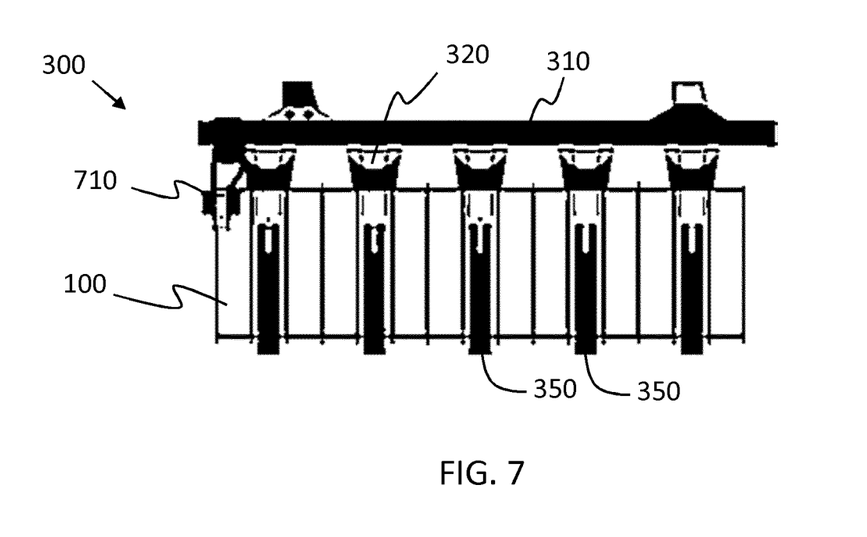

FIG. 7 illustrates top view of a battery pack 100 attached to a vehicle frame 310. FIG. 7 also schematically shows connections 710 between the battery pack and the vehicle.

Figure 8:
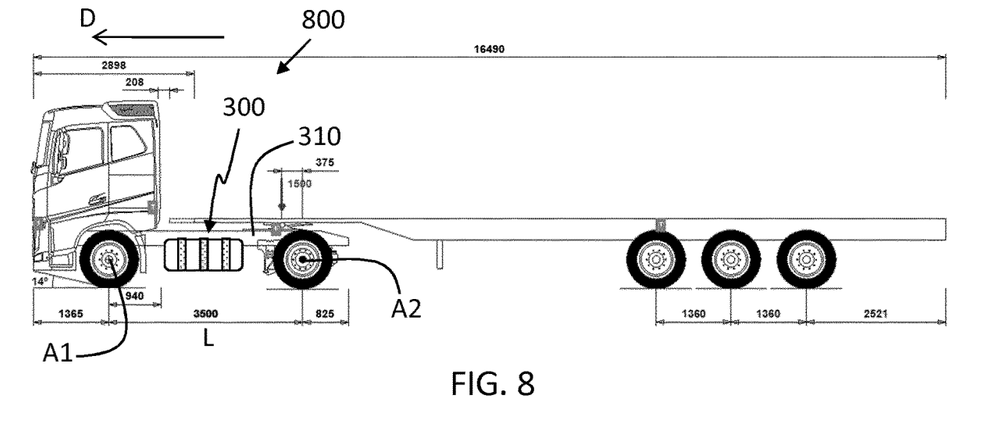
FIG. 8 schematically illustrates a vehicle with a battery pack.

FIG. 8 schematically illustrates a vehicle 800 comprising the fastening arrangement 300 according to the present teaching. The one or more main brackets are arranged on a frame rail of the vehicle 800 between first and second wheel axles A1, A2, and laterally compared to a forward direction D of the vehicle.

Thus, FIG. 8 shows a vehicle 800 comprising one or more main brackets 320 attached to the vehicle frame 310. Each main bracket 320 comprises a receiving member 340 arranged to hangably support a corresponding mounting element 170, 220 on the battery pack 100. The vehicle is arranged to receive one or more mounting straps 350, 350a, 350b arranged to press the battery pack against the main brackets.

Figure 9:
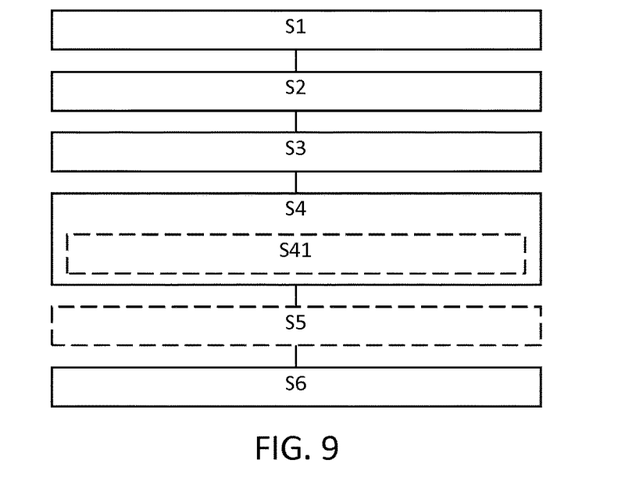
FIG. 9 is a flow chart illustrating methods.

FIG. 9 is a flow chart illustrating methods. There is illustrated a method for securing a battery pack 100, 200 to a vehicle 800. The method comprises;

attaching S1 one or more main brackets 320 to a frame 310 of the vehicle, each main bracket comprising a receiving member 340 arranged to hangably support a corresponding mounting element 170, 220, obtaining S2 a battery pack 100, 200 comprising one or more of the mounting elements 170, 220, wherein each mounting element is arranged to be hangably supported by a corresponding receiving member 340 of a main bracket 320, hanging S3 the battery pack 100, 200 by the mounting elements 170, 220 on the main bracket receiving members 340, providing S4 one or more mounting straps 350, 350a, 350b, and pressing S6 the battery pack 100, 200 against the main brackets 320 by the mounting straps 350, 350a, 350b, thereby securing the battery pack to the vehicle frame 310.

This method of assembling a battery pack to a vehicle 800 was exemplified above in connection to FIGS. 3a, 3b, 4a, 4b, and 5. The relevant method parts are indicated in these figures.

It is appreciated that the mounting straps 350, 350a, 350b can be arranged in a number of different ways to press S6 the battery pack 100, 200 against the main brackets 320. One such option was illustrated in FIG. 10, where top 350a, and bottom 350b mounting straps were used instead of mounting straps 350 extending over the whole battery pack. Other mounting strap configurations are also possible.

According to some aspects, the method comprises providing S41 a first mounting strap 350' having a pretension or stiffness different from a pretension or stiffness of a second mounting strap 350", thereby allowing for control of load distribution between the first and the second mounting straps.

According to some other aspects, the method comprises configuring S5 a first mounting strap 350' arranged closer to a mid-point M of the battery pack 100, 200 with a larger stiffness compared to a second mounting strap 350" arranged farther away from the mid-point M.

Mounting straps with variable stiffness and/or pretensions was discussed above in connection to FIG. 6.

The invention claimed is:

1. A system for attaching a battery pack to a vehicle frame of a vehicle, the system comprising:
   a battery pack, and
   a fastening arrangement comprising:
      one or more main brackets arranged attachable to the vehicle frame, each main bracket comprising a receiving member arranged to hangably support a corresponding mounting element,
      one or more of the mounting elements configured attachable to the battery pack, one or more mounting straps arranged to press the battery pack against the one or more main brackets, wherein a pretension or stiffness of a first mounting strap is different from a pretension or stiffness of a second mounting strap for control of load distribution between the first and second mounting straps.

2. The system of claim 1, wherein the battery pack comprises a plurality of modules arranged adjacent to each other, each module comprising first and second opposite side walls arranged to face respective side walls of adjacent modules, the fastening arrangement further comprising at least one intermediary bracket arranged between the side walls of two adjacent modules to increase a structural integrity of the battery pack, wherein the intermediary bracket comprises one of the mounting elements arranged to be hangably supported by a receiving member of a main bracket of the one or more main brackets.

3. The system of claim 1, wherein the first mounting strap is arranged closer to a mid-point of the battery pack and has a larger stiffness compared to the second mounting strap which is arranged farther away from the mid-point compared to the first mounting strap, thereby providing a more even load distribution between the first and the second mounting straps.

4. The system of claim 1, wherein the one or more main brackets comprise resilient elements configured between the main brackets and the battery pack when the battery pack is pressed against the one or more main brackets.

5. A vehicle comprising:
a vehicle frame, and
a system for attaching a battery pack to the vehicle frame, the system comprising:
a battery pack, and
a fastening arrangement comprising:
one or more main brackets arranged attachable to the vehicle frame, each main bracket comprising a receiving member arranged to hangably support a corresponding mounting element,
one or more of the mounting elements configured attachable to the battery pack,
one or more mounting straps arranged to press the battery pack against the one or more main brackets,
wherein a pretension or stiffness of a first mounting strap is different from a pretension or stiffness of a second mounting strap for control of load distribution between the first and second mounting straps.

6. The vehicle of claim 5, wherein the one or more main brackets are arranged on a frame rail between first and second wheel axles of the vehicle, laterally compared to a forward direction of the vehicle.

7. A method for securing a battery pack to a vehicle frame of a vehicle using a system according to claim 1, the method comprising:
attaching one or more main brackets to the vehicle frame, each main bracket comprising a receiving member arranged to hangably support a corresponding mounting element,
obtaining a battery pack comprising one or more of the mounting elements, wherein each mounting element is arranged to be hangably supported by a corresponding receiving member of a main bracket,
hanging the battery pack by the mounting elements on the main bracket receiving members,
providing a first mounting strap having a pretension or stiffness different from a pretension or stiffness of a second mounting strap for control of load distribution between the first and the second mounting straps, and
pressing the battery pack against the main brackets by the mounting straps to secure the battery pack to the vehicle frame.

8. The method of claim 7, further comprising configuring a first mounting strap arranged closer to a mid-point of the battery pack with a larger stiffness compared to a second mounting strap arranged farther away from the mid-point.

\* \* \* \* \*